United States Patent [19]

Kuhn et al.

[11] Patent Number: 5,785,651
[45] Date of Patent: Jul. 28, 1998

[54] DISTANCE MEASURING CONFOCAL MICROSCOPE

[75] Inventors: William P. Kuhn, Tucson, Ariz.; Phillip C. Baker, Orinda, Calif.

[73] Assignee: KeraVision, Inc., Fremont, Calif.

[21] Appl. No.: 484,204

[22] Filed: Jun. 7, 1995

[51] Int. Cl.$^6$ .............. A61B 3/10; A61B 3/107
[52] U.S. Cl. .............. 600/310; 250/339.06; 600/398
[58] Field of Search .............. 128/645, 665, 128/745; 606/4, 10, 11; 250/339.01, 339.06, 339.07; 33/511, 512, 274 R; 356/381, 382; 600/310, 318, 398, 558

[56] References Cited

U.S. PATENT DOCUMENTS

| | | | |
|---|---|---|---|
| 4,407,008 | 9/1983 | Schmidt et al. | 358/93 |
| 4,585,349 | 4/1986 | Gross et al. | 356/375 |
| 4,844,617 | 7/1989 | Kelderman et al. | 356/372 |
| 4,883,061 | 11/1989 | Zeimer | 128/665 |
| 4,965,441 | 10/1990 | Picard | 359/389 |
| 5,083,220 | 1/1992 | Hill | 359/234 |
| 5,084,612 | 1/1992 | Iwasaki et al. | 250/216 |
| 5,109,276 | 4/1992 | Nudelman et al. | 348/47 |
| 5,117,466 | 5/1992 | Buican et al. | 382/133 |
| 5,120,953 | 6/1992 | Harris | 250/227.2 |
| 5,161,052 | 11/1992 | Hill | 359/377 |
| 5,161,053 | 11/1992 | Dabbs | 359/384 |
| 5,165,063 | 11/1992 | Strater et al. | 356/4 |
| 5,192,980 | 3/1993 | Dixon et al. | 356/326 |
| 5,194,918 | 3/1993 | Kino et al. | 356/359 |
| 5,200,819 | 4/1993 | Nudelman et al. | 348/65 |
| 5,200,838 | 4/1993 | Nudelman et al. | 358/443 |
| 5,208,648 | 5/1993 | Batchelder et al. | 356/237 |
| 5,220,403 | 6/1993 | Batchelder et al. | 356/345 |
| 5,223,715 | 6/1993 | Taylor | 250/343 |
| 5,225,678 | 7/1993 | Messerschmidt | 250/339 |

(List continued on next page.)

FOREIGN PATENT DOCUMENTS

| | | | |
|---|---|---|---|
| 0142464 | 5/1985 | European Pat. Off. | G01B 11/02 |
| 0044204 | 2/1990 | Japan | 356/381 |
| 2144537 | 3/1985 | United Kingdom | G01B 11/24 |
| 2278193 | 11/1994 | United Kingdom | 356/381 |
| 88/10406 | 12/1988 | WIPO | G01B 11/02 |
| 92/19930 | 11/1992 | WIPO | G10B 9/02 |

OTHER PUBLICATIONS

Mathisen et al, "Thin–Film Measurement", *IBM Technical Disclosure Bulletin*, vol. 19, No. 9, Feb. 1977 pp. 3514–3516.

Molesini et al., "Focus–Wavelength Encoded Optical Profilometer," *Optics Communications* 49(4): 229–233 (1984).

Maly et al., "Real–Time Stereoscopic Confocal Reflection Microscopy Using Objective Lenses with Linear Longitudinal Chromatic Dispersion," *Scanning* 16(3): 187–192 (1994).

*Primary Examiner*—William E. Kamm
*Assistant Examiner*—Carl H. Layno
*Attorney, Agent, or Firm*—Morrison & Foerster LLP

[57] ABSTRACT

A novel apparatus and method for the quick and accurate determination of surface profile and depth reading within little or no mechanical motion is presented comprising a polychromatic light source; a means for focusing the light onto a point of sample target, said means having a known amount of longitudinal chromatic aberration; and a means for detecting the wavelengths of light reflected from the sample target. The light projected onto the sample target is focused according to wavelength due to the longitudinal chromatic aberration. While light from across the spectrum will be reflected, the light returning from the sample target will be most strongly reflected in a wavelength that is focused on a reflective point in the sample. The means for detecting the light in the present invention passes through a substantially pinhole aperture before the light is detected according to wavelength. The purpose of the pinhole aperture is resolution. The pinhole aperture ensures that those wavelengths that focus onto the pinhole are more strongly detected than wavelengths that do not focus on the aperture. Thus, the resolution of wavelength intensity peaks is greatly increased.

12 Claims, 11 Drawing Sheets

U.S. PATENT DOCUMENTS

| | | | |
|---|---|---|---|
| 5,239,178 | 8/1993 | Derndinger et al. | 350/234 |
| 5,241,364 | 8/1993 | Kimura | 356/351 |
| 5,260,569 | 11/1993 | Kimura | 250/234 |
| 5,283,433 | 2/1994 | Tsien | 250/234 |
| 5,296,700 | 3/1994 | Kumagai | 250/216 |
| 5,296,703 | 3/1994 | Tsien | 250/235 |
| 5,303,709 | 4/1994 | Drehr et al. | 128/665 |
| 5,306,902 | 4/1994 | Goodman | 250/201.3 |
| 5,307,203 | 4/1994 | Hill | 359/368 |
| 5,311,021 | 5/1994 | Messerschmidt | 250/339 |
| 5,318,047 | 6/1994 | Davenport et al. | 128/898 |
| 5,329,352 | 7/1994 | Jacobsen | 356/301 |
| 5,355,252 | 10/1994 | Haraguchi | 359/369 |
| 5,474,066 | 12/1995 | Grolman | 128/645 |
| 5,542,422 | 8/1996 | Hayden | 128/665 |

DISTANCE MEASURING CONFOCAL MICROSCOPE

FIELD OF THE INVENTION

The present invention relates in general to a system and method for measuring distances and, in particular, to a system and method for measuring distances using confocal microscopes that map the distance of an object from the microscope to the wavelength of received light.

BACKGROUND OF THE INVENTION

In the field of eye surgery, it is known to make incisions of a controlled depth and to implant devices directly into the eye to correct an array of vision defects. One such implantable device, called an Intrastromal Corneal Ring (ICR), is a substantially annular ring that, once inserted into the cornea at a specific depth, induces a change in the shape of the cornea; thereby improving the focus of incoming light onto the retina. ICRs are made by KeraVision, Inc. and are further discussed in U.S. Pat. No. 5,318,047, entitled METHOD FOR CORNEAL CURVATURE VARIATION, and issued to Davenport et al. on Jun. 7, 1994, which is hereby incorporated by reference.

In order to correct vision with an implantable ICR, two steps are generally taken. First, the patient's vision must be evaluated to determine the exact specification of the ICR that will correct the defect. Second, the selected ICR must be surgically implanted into the patient's eye. To implant the ICR at a depth corresponding to a percentage of the corneal thickness, the corneal thickness must be determined. Once the corneal thickness is measured, a setting is made on an adjustable surgical knife to cut to a desired control depth.

One prior method for determining the thickness of the cornea is through ultrasound scanning. To measure the corneal thickness accurately, it is necessary to use acoustic energy of a sufficiently short wavelength, or equivalently, a high enough frequency. Acoustic energy at an appropriately high frequency cannot be efficiently coupled from a probe to the cornea through air. Thus, acoustic methods require intimate physical contact between the detector transfer medium and the eye to measure the thickness of the cornea with any reasonable degree of resolution.

Contact between the detector transfer medium and the eye is, however, undesirable. First, there is a need for sterility while operating on the eye. Thus, any object that comes into contact with the eye must itself be sterilized. Second, any contact with the eye is uncomfortable for the patient and should be minimized or eliminated altogether. Third, any procedure—not necessarily ultrasound—that requires contact with the eye introduces a distortion into the surface of the eye that must be accounted for when producing a profile of the eye's surface.

One promising technology in the field of microscopy imaging and surface profilometry is confocal microscopy. Confocal microscopy is an effective means of obtaining high resolution images in both lateral dimension and in depth. In typical confocal microscopy, a monochromatic point source of light is projected onto a surface and a portion of the reflected light is separated and then imaged onto a pinhole. The amount of light through the pinhole is measured by a detector.

FIG. 1 depicts a conventional confocal microscope that may be used to determine depth and surface topology. Confocal microscope 10 comprises a light source 12, input optics 14, beam splitter 16, objective lens 18, output lens 20, pinhole aperture 22, and detector 24. Light from source 12 is first collimated by input optics 14 which consists itself of condenser lens 26 and collimating lens 28, and source pinhole aperture 30. Once collimated, the light passes through beam splitter 16 and focused onto target 32 by objective lens 18. A portion light reflected by target 32 is again reflected by beam splitter 16 and focused onto to pinhole 22 by output lens 20. The quantity of light passing through pinhole 22 is then measured by detector 24.

Also depicted in FIG. 1 is the manner in which confocal microscope 10 determines depth. Depicted in dotted line is target 32' that is not at the focus of objective lens 18. The reflected light from target 32', also in dotted line, is dispersed more widely by the time it reaches pinhole aperture 30. Thus, the intensity of the light reaching detector 24 is diminished for out-of-focus targets. Therefore, the total light energy reaching the detector is inversely proportional to the distance a target is from the plane of best focus. This signal can be used to control the position of the microscope until a maximum signal is returned. At this point the position of the microscope is recorded as the height of the object at that point.

The lateral resolution of a confocal microscope is better than a normal microscope. Since only the point of interest is illuminated, scattered light is greatly reduced. In addition, the nearly perfect on-axis through point is used. As a result lateral resolution is much better that a standard microscope. Additionally, very high resolution in depth is obtained since the returned signal falls off very rapidly as the surface is moved away from the plane of best focus. A confocal microscope images only a single point of the object at a time—as compared to a typical microscope which can image an entire field of view simultaneously. To acquire an image of the entire field-of-view requires a scanning mechanism. One such method is to simply place the object on a stage that can be translated laterally.

An additional benefit to the very strong depth resolution of the confocal microscope is to provide the ability to take vertical, optical sections of an object. After an entire image is obtained at one focal position by scanning an object laterally, the object may be moved vertically relative to the microscope for a repeat scan at the new focal position. Likewise, an object's surface topology is easily taken. All that is necessary is to measure the distance of the microscope from the object that provides the strongest return signal, then step to the next point and repeat the exercise.

Conventional confocal microscopes have produced accurate, mechanically scanned, non-contact profilometers. The problem with a mechanical scanning apparatus is speed. In scanning a human eye, speed is of the essence. Before surgery while the eye's profile is taken to determine which particular ICR to implant, the eye moves a great deal and the eyelids close frequently. Additionally, measurable variations in surface shape may occur with the beating of the patient's heart which creates small fluctuations in intraocular pressure.

However, conventional confocal microscopes need to focus the object in question in order to accurately read the depth of the object. Returning to the example of the implanted ICR, a conventional confocal microscope would have to mechanically focus the ICR to read the depth of the implant. This need to mechanically focus reduces the speed of scanning possible with a conventional confocal microscope; and therefore decreasing the desirability of an eye scanner based on this type of microscope.

Some have used the notion of introducing a certain amount of known longitudinal chromatic aberration ("LCA") into the objective lens in order to read depth. For example, in UK Patent Application, GB 2,144,537A, published Mar. 6, 1985 (filed on Aug. 1, 1984) and entitled PROFILE MEASURING INSTRUMENT, Giuseppe Molesini describes an optical profile measuring instrument having a polychromatic light source whose light is focused through a objective lens having known LCA onto a sample target. The light reflected returns to the instrument and is dispersed according to wavelength onto an array of photodiodes.

The various returned wavelengths and their amplitudes are read by the array of photodiodes. These recorded wavelengths correspond to the distance of the reflecting surface. In this manner, a surface profile may be taken by Molesini's instrument. The limitations to Molesini's instrument, however, are seen most clearly when considering the application of discerning the depth of an ICR implant. Since ICRs are typically implanted beneath the surface of the cornea, the returning wavelengths from the surface of the cornea will be less scattered and more intense than returning wavelengths from the ICR implant. Because of this difference in intensity and scattering between the reflection from these two surfaces, an instrument made in the manner of Molesini's disclosure does not have capability to discern between the two reflected wavelengths. Thus, it is very difficult to determine the depth of an ICR implant using Molesini's instrument.

Thus, there still remains a need to quickly and accurately measure through the thickness of the cornea in a non-contacting manner.

SUMMARY OF THE INVENTION

Other features and advantages of the present invention will be apparent from the following description of the preferred embodiments, and from the claims.

The present invention is a novel apparatus and method for the quick and accurate determination of surface profile and depth reading with little or no mechanical motion. The presently claimed apparatus comprises a polychromatic light source; a means for focusing the light onto a point of sample target, said means having a known amount of longitudinal chromatic aberration; and a means for detecting the wavelengths of light reflected from the sample target.

The light projected onto the sample target is focused different distances according to wavelength due to the longitudinal chromatic aberration. While light from across the spectrum will be reflected, the light returning from the sample target and reaching the detector will be most intense at a wavelength that happens to focus on a reflective point in the sample.

The means for detecting the light in the present invention passes through a substantially pinhole aperture before the light is detected according to wavelength. The purpose of the pinhole aperture is resolution. The pinhole aperture ensures that those wavelengths that focus onto the pinhole are more strongly detected than wavelengths that do not focus on the aperture. Thus, the resolution of wavelength intensity peaks is greatly increased.

One advantage of the present invention is improved resolution to determine thicknesses and depth of various surfaces in a given sample. For example, the present invention is able to discern the depth of an ICR implant in the cornea. The light projected on to the eye initially meets two relatively reflective surfaces: the anterior surface of the cornea and the ICR implant at a depth of a fraction of a millimeter below the anterior surface. Thus, the returning light more strongly reflects at those two wavelengths that focus at those surfaces than at other wavelengths.

The means for detecting the reflected light further filters out the other wavelengths by having the light pass through a pinhole aperture. Those wavelengths that focus onto the aperture will be passed with greater intensity. Thus, other non-focused wavelengths are abated in intensity before reaching the detector.

For a full understanding of the present invention, reference should now be made to the following detailed description of the preferred embodiments of the invention and to the accompanying drawings.

DETAILED DESCRIPTION OF THE INVENTION

As mentioned above, as an alternative to the vertical motion in a profilometer made from a confocal microscope, it is possible to use a polychromatic light source and encode distance by wavelength. This is accomplished by intentionally designing in a substantial amount of longitudinal chromatic aberration. Rather than just measure the total amount of light returned to the detector it is necessary to measure the spectrum (amount of light as a function of wavelength) of the returned light. This spectrum is then a direct measurement of the distance from the lens when corrected for refractive index of the object measured.

The present invention uses the notions of confocal microscopy and longitudinal chromatic aberration together to create a system that allows the measurement of distance between closely spaced, reflective surfaces—without the need to mechanically move the system relative to the object for a given lateral location.

Several embodiments of confocal microscopes made in accordance with the principles of the present invention will now be given. It will be appreciated, however, that although the present invention finds application in the field of vision correction, the present invention may be employed in any problem setting that requires an accurate and fast means for measuring the shape of a surface or the thickness of a material where the surfaces of the material defining the thickness may be closely spaced.

FIRST EMBODIMENT

Figure 1:
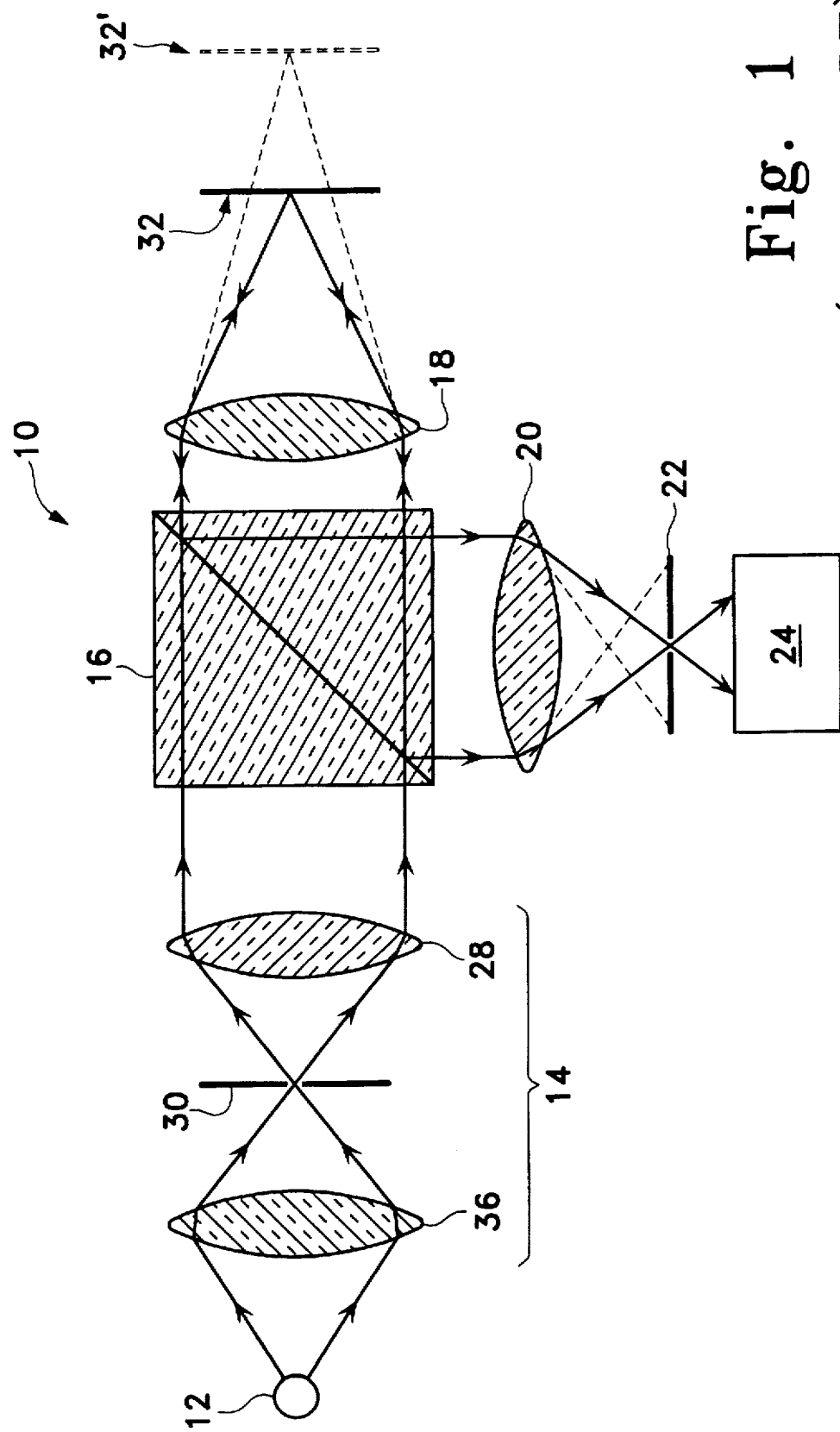
FIG. 1 is a high level schematic diagram of a conventional confocal microscope.
Figure 2A:
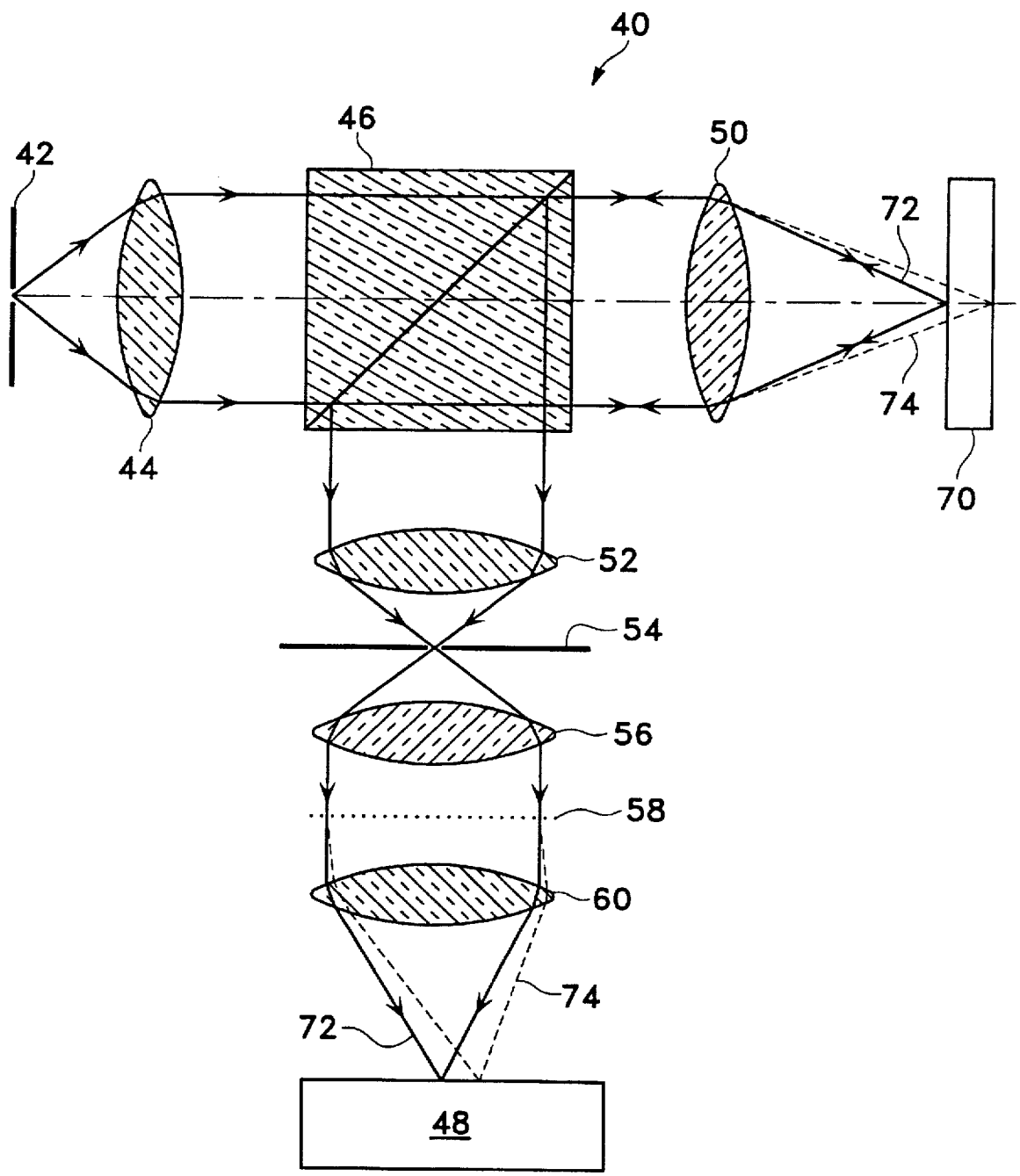
FIGS. 2A and 2B depict a first embodiment of a distance measuring confocal microscope made in accordance with the principles of the present invention.

Referring now to FIG. 2A, a first embodiment 40 of a nonmechanical, distance measuring confocal microscope made in accordance with the principles of the present invention is depicted. This embodiment comprises pinhole light source 42 (e.g. source 12 and condenser lens 26 in FIG. 1), first collimator 44, beam splitter 46, spectrometer 48, first objective lens 50, second objective lens 52, pinhole aperture 54, second collimator 56, grating 58, and imaging lens 60.

In operation, system 40 emits polychromatic light from pinhole source 42. Light source 42 may be comprised of one or more lasers or a broad band source, such as white light. However constructed, the only requirement is that light source 42 emit more than one wavelength so that depth distance may be determined by the spectral spread of reflected light. This light, collimated by lens 44, is transmitted through beamsplitter 46. About half of the incident light is lost principally by reflection out of the top by beamsplitter 46, and scattering or the like, while the other half of this light passes through first objective lens 50.

Objective lens 50 is constructed with a known amount of longitudinal chromatic aberration. Thus, the incident light beam spreads out longitudinally according to wavelength. This is depicted in FIG. 2A as the incident beam focuses with its a comparatively shorter wavelength as solid beam 72 and a comparatively longer wavelength as dotted beam 74. For the purposes of illustration, object 70 is conveniently placed in this figure—having a first surface located at the focal point of beam 72 and a second surface at the focal point of beam 74. As these surfaces are at the focal point of these two beams, most of the light from these two beams will be collected and detected; while other beams (i.e. other wavelengths) will be filtered by pinhole aperture 54 and largely attenuated at the detector 48. It will be appreciated that the LCA range should preferably be longer than the maximum thickness of the object.

The reflected light retraces the same optical path backwards—collimated by objective lens 50, until the reflected light impinges on beamsplitter 46. At beamsplitter 46, approximately half of this light is reflected downward to second objective lens 52. Second objective lens 52 could be designed to have no or very little LCA. As an alternative design, all three lenses 44, 50, and 52 could be designed to have a known amount of LCA. Pinhole aperture is advantageously positioned at the focal point of second objective lens 52. Thus, any collimated light, regardless of wavelength, is focused by lens 52 onto pinhole aperture 54 and passed along to the detector stage.

Other wavelengths of light that were not collimated by objective lens 50 do not focus precisely onto pinhole aperture 54. Thus, the intensity of these other wavelengths are greatly attenuated. In effect, pinhole aperture 54 acts as a filter. This unique arrangement allows for the resolution of very close distances between reflective surfaces on objects, such as object 70.

Once past pinhole aperture 54, these "preferred" wavelengths are passed onto to a spectrometer detector (e.g. comprising elements 56, 58, 60, and 48). These wavelengths are once again collimated by lens 56 to be laterally dispersed by grating 58. Imaging lens 60 focuses these dispersed beams 72 and 74 onto detector 48 where these wavelengths (and their intensities) are recorded. If the response of the spectrometer is normalized by the source spectrum then the peak wavelength in the spectrum will correspond to a specific position of the object relative to the objective lens. This permits the longitudinal profile to be determined without the need to mechanically control the spacing between the objective lens and object.

Figure 2B:
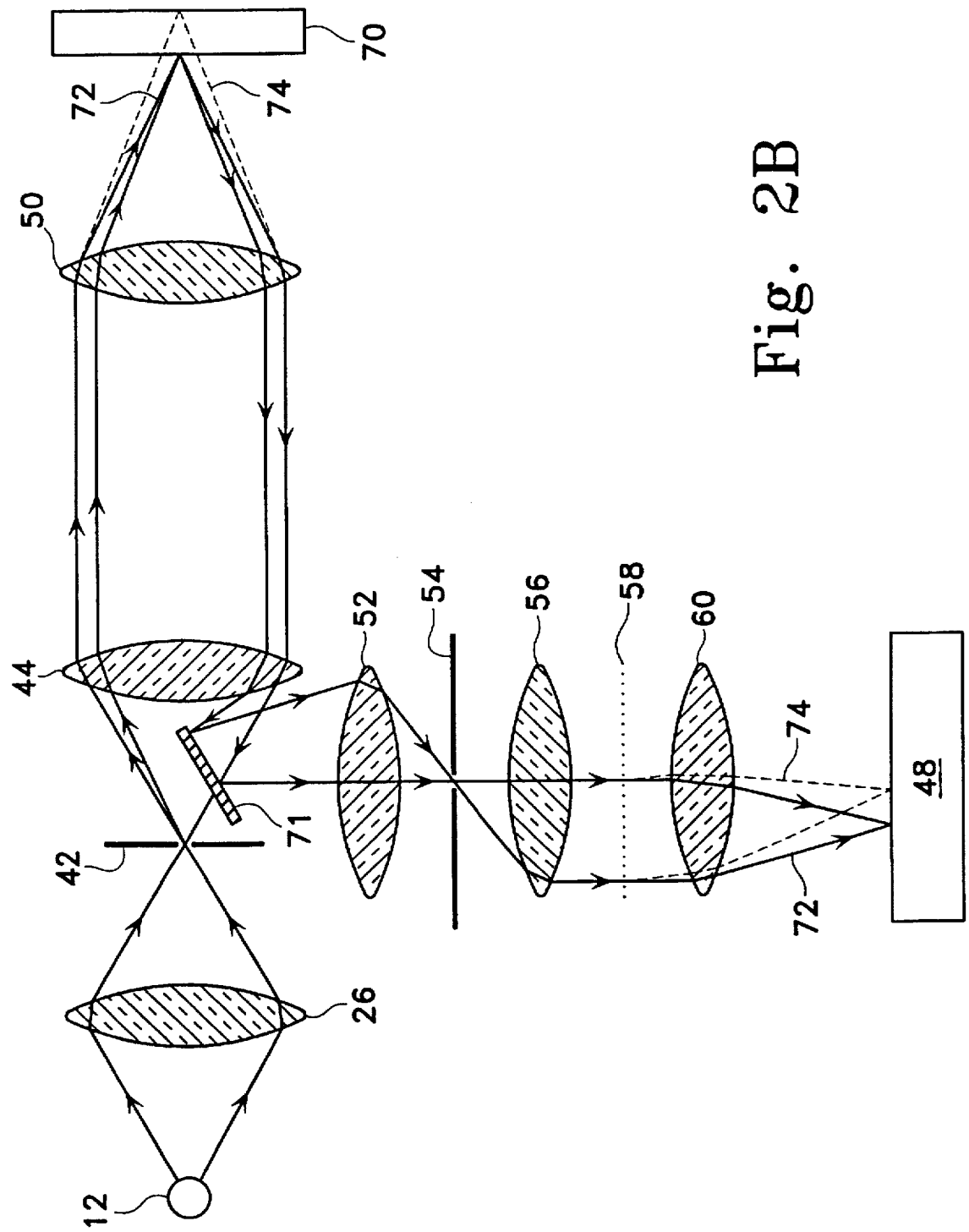

A variation of the first embodiment is depicted in FIG. 2B. The main difference between FIG. 2A and FIG. 2B is the addition of mirror 71 in FIG. 2B. One advantage of the addition of mirror 71 is the elimination of the need of beamsplitter 46 in FIG. 2A. As can be seen, with mirror 71 placed in the optical path as situated, approximately one half of the polychromatic beam passes through lens 44 and impinges onto object 70. The longitudinal spread of beams still impinges on object 70 in the same manner as in FIG. 2A; however, on the return reflection, approximately one half of the reflected light is intercepted and reflected downward by mirror 71. The path of the reflected light passes through the same optical elements as before in FIG. 2A, culminating in a lateral spread of beams at detector 48.

SECOND EMBODIMENT

Figure 3:
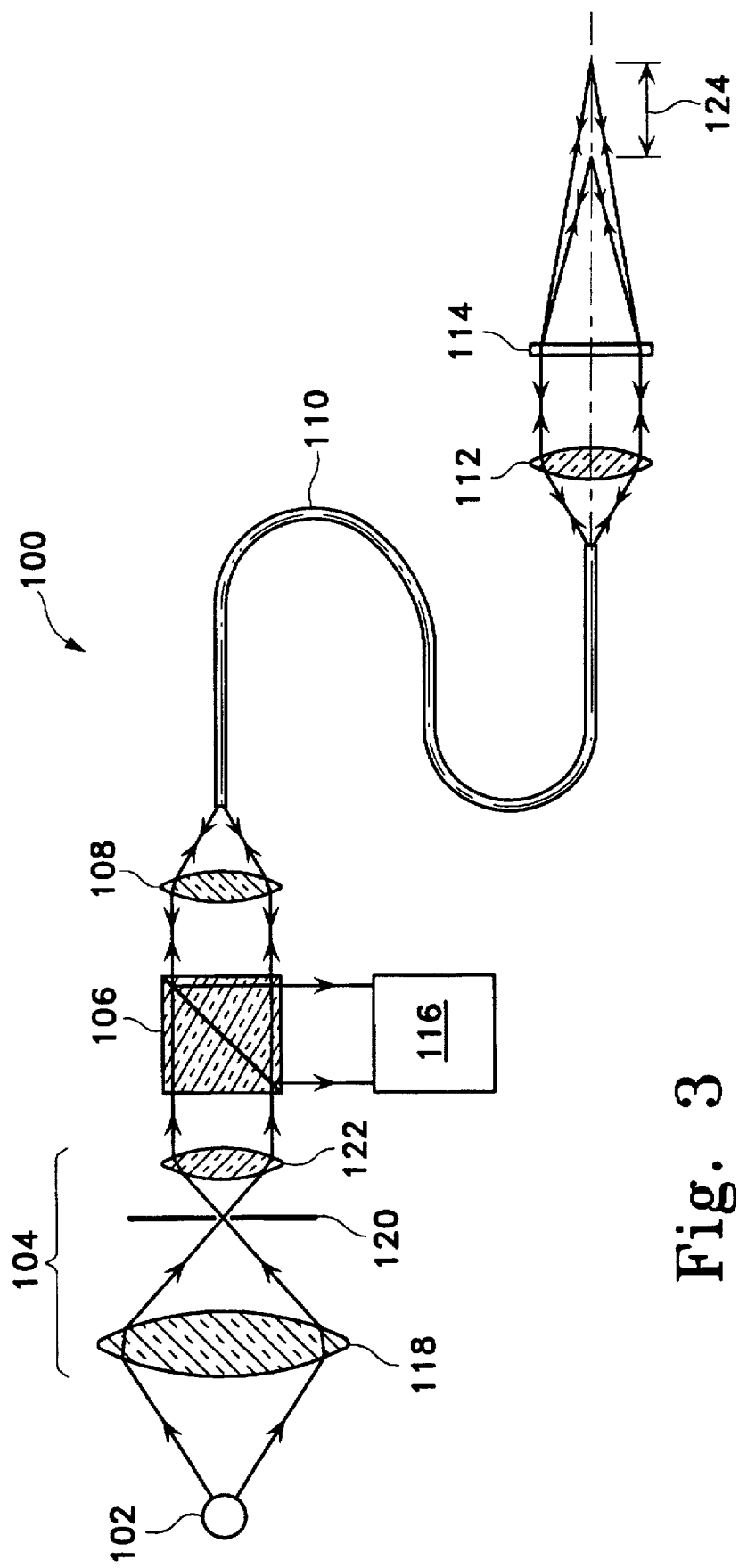
FIG. 3 is a second embodiment of a distance measuring confocal microscope made in accordance with the principles of the present invention.

A second embodiment of the present invention is shown in FIG. 3. System 100 comprises polychromatic light source 102, input optics 104, beamsplitter 106, first objective lens 108, fiber optic cable 110, collimator lens 112, Fresnel zone plate 114, and spectrometer 116. Input optics 104 comprises a first lens 118, pinhole aperture 120 and collimator lens 122.

In operation, system 100 provides the same basic functioning as the first embodiment; but achieved through a slightly different configuration. Input optics 104 projects collimated polychromatic light from light source 102 onto beamsplitter 106. First objective lens 108 focuses the light into fiber optic cable 110 which provides input light into achromatic collimator lens 112. Achromatic collimator lens 112 provides, in turn, collimated light without undue chromatic aberration onto Fresnel zone plate 114.

Zone plate 114 can be either a diffractive or holographic optical element, as is well known in the art. The function of the zone plate 114 is to provide a known amount of longitudinal chromatic aberration. It will be appreciated that all embodiments of the present invention encompass all means of providing known LCA, including, but not limited to: lenses having known LCA, zone plates, gratings, and the like.

As can be seen in FIG. 3, zone plate 114 provide a spectral spread 124, where the focal point of the projected light varies according to wavelength. As with the first embodiment, the wavelength that finds a reflective surface at its focal point is strongly reflected back through zone plate 114 and lens 112. Since lens 112 focuses these "preferred" wavelengths to the substantially pinhole size aperture of fiber optic cable 110, fiber optic cable essentially performs the same function as pinhole aperture 54 in FIG. 2A. In fact, wavelengths that are not reflected back from their focal point in spread 124 are attenuated in the same fashion as with aperture 54. Thus, fiber optic cable 110 acts as the filter for system 100. Light emerges from fiber optic cable 110, is collimated by lens 108, reflected off beamsplitter 106, and detected by spectrometer 116.

It will be appreciated that the present invention encompasses any other method of providing this filtering effect to provide sharp resolution by wavelength. Thus, the present invention should not be limited merely to the two embodiments disclosed here.

A feature of this second embodiment is the use of fiber optic cable 110. The use of cable 110 allows sufficient mobility of the achromatic collimator lens 112 and zone plate 114 to be used as a probe. One problem with this fiber optic design is the potential for strong reflection from the end of the fiber from the light coming from source 120 and overpowering the signal from the return light reflected by the point of interest. This problem may be avoided by employing the third embodiment of the present invention as described below.

THIRD EMBODIMENT

Figure 4:
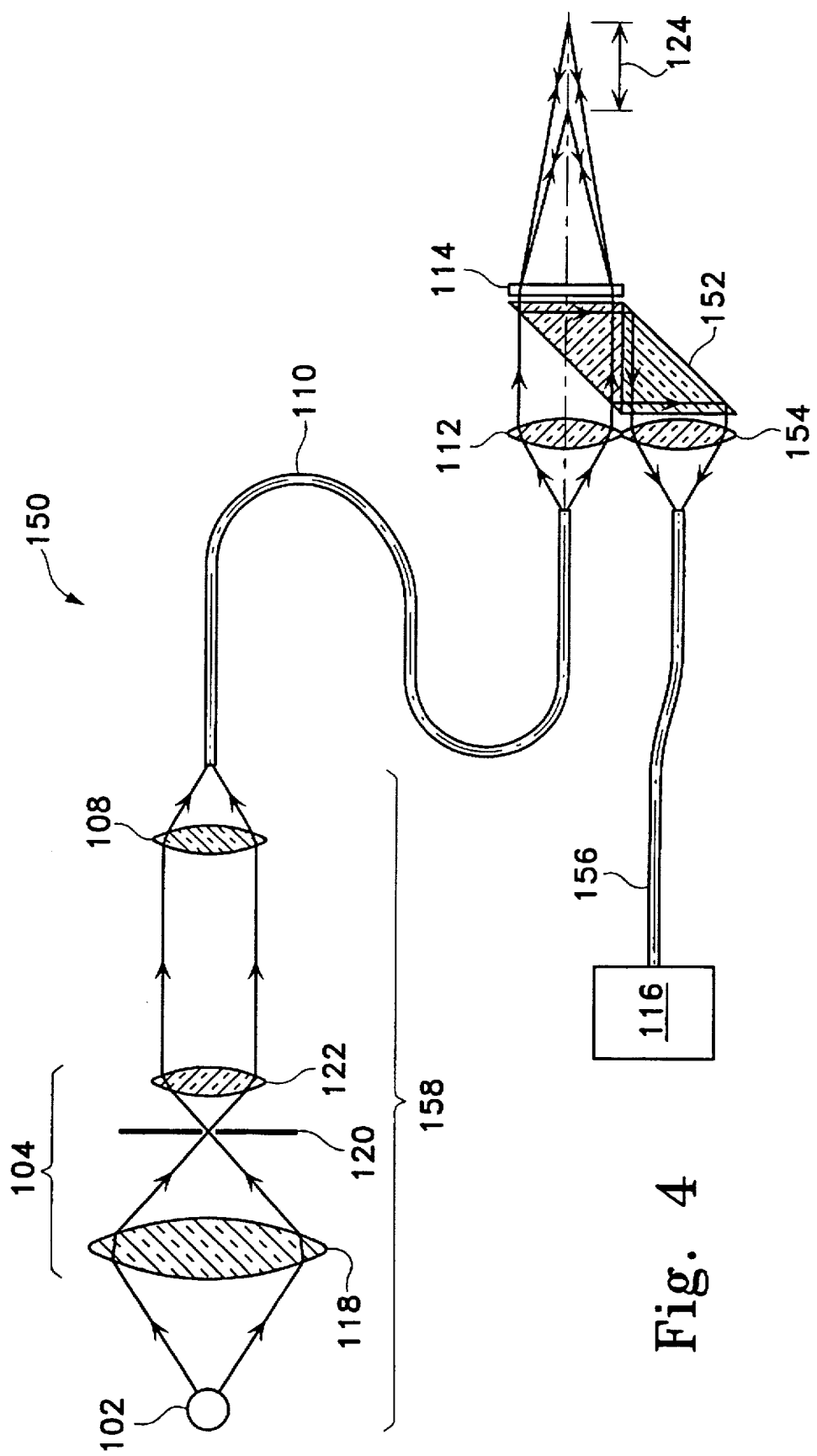
FIG. 4 is a third embodiment of a distance measuring confocal microscope made in accordance with the principles of the present invention.

Referring to FIG. 4, a third embodiment 150 of the present invention is given. The basic idea behind the third embodiment is to provide two separate optical paths—one for the input light from source 42 and another for the reflected light from the point of interest.

System 150 has many elements in common with system 100, with like numerals describing like elements. The additional optical elements needed for this embodiment comprise: beamsplitter/translator 152, second achromatic collimator lens 154, and second fiber optic cable 156. As is apparent from FIG. 4, reflected light from the object is split off and translated by beamsplitter/translator 152 and focused by achromatic collimator lens 154 into second fiber optic cable 156, and finally into spectrometer 116.

It will be appreciated that beamsplitter/translator 152 could be made from a set of prisms that are contacted and have coatings at the beamsplitting interface. This would maintain alignment much better than the use of a cube splitter and separate mirror, as this element is usually constructed in the art.

FOURTH EMBODIMENT

Figure 5:
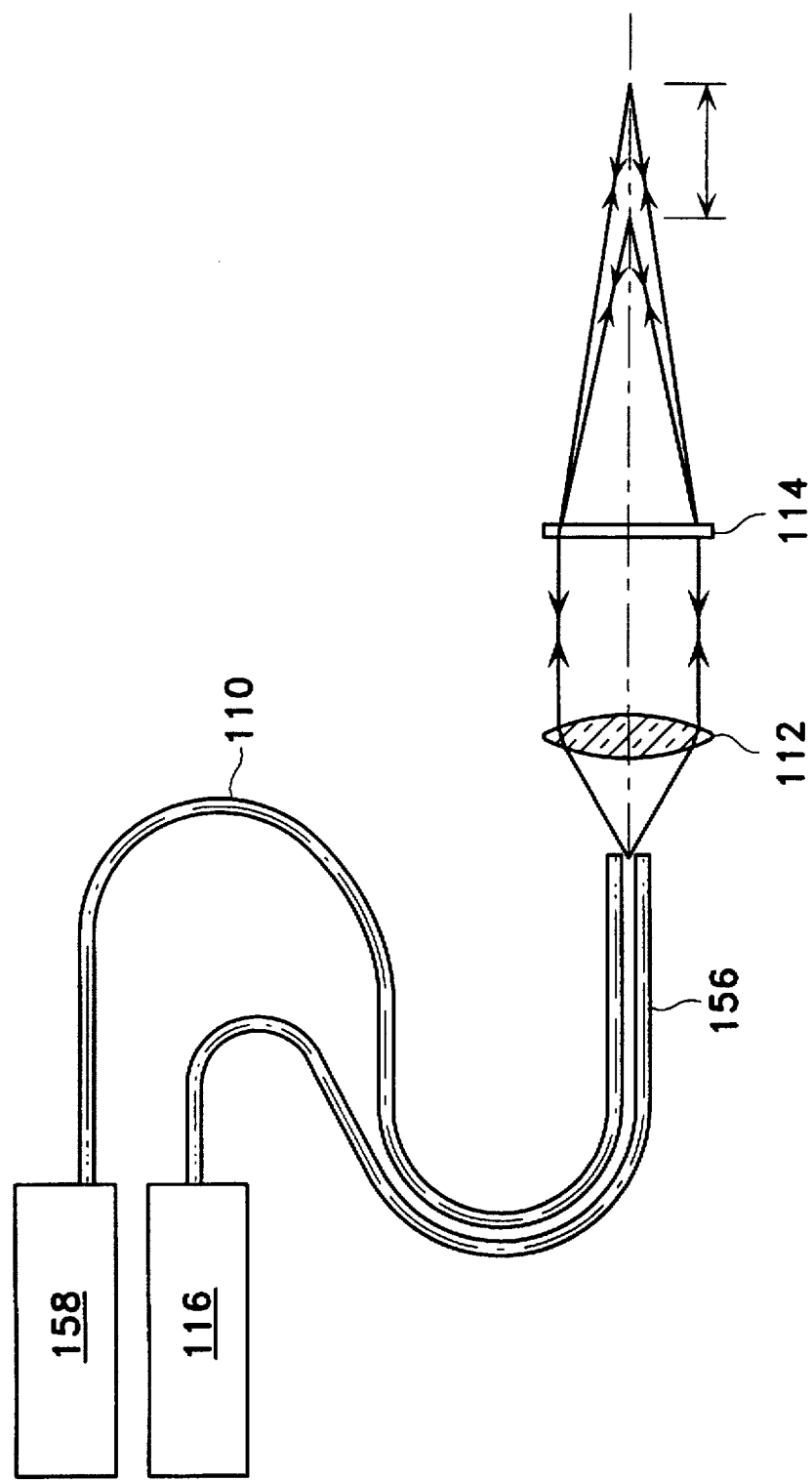
FIG. 5 is a fourth embodiment of a distance measuring confocal microscope made in accordance with the principles of the present invention.

A fourth embodiment is shown in FIG. 5 that is similar to the third embodiment given in FIG. 4, with like numerals describing like elements. In this fourth embodiment, again source 158 and detector 116 are divided as separate components. The main difference is that the fourth embodiment uses only one collimator lens 112 instead of two (as provided in FIG. 4). This is accomplished by slightly offsetting both fiber optic cables 110 and 156 slightly and symmetrically off-axis.

For all four above-described embodiments, once the present system has detected two wavelengths corresponding to the front surface of the cornea and a second surface in the cornea respectively, it is necessary to correlate the difference in the respective wavelengths to the actual distances from these two surfaces. As is known in the art, light travelling through any medium other than a vacuum changes its speed based on the medium's refractive index. Thus, the differences in the detected wavelengths must be corrected for the difference in the refractive index of cornea versus air. These calculations are well known to those skilled in the optical arts.

SINGLET AND DOUBLET OPTICAL LENS DESIGNS

As mentioned, the above embodiments may use any number of optical elements that have a known amount of LCA. In particular, two lens systems (i.e. a singlet and a doublet lens system) have been designed to have a known amount of LCA for the purposes of the present invention. Computer simulations have been run to model the wavelength resolution of these lens designs.

The designs of these lens for the present invention differ from lens to be used in conventional confocal microscopy. The fundamental requirement for a conventional confocal system is to have perfect (at least near diffraction limited) imaging on axis over the wavelength band of the source. Often a confocal microscope is used with a monochromatic laser source, suggesting that the system needs only to be optimized for a specific wavelength of light. Thus, a typical scanning confocal microscope is well corrected for color.

For the purposes of the present invention, however, the constraints are different. Near perfect axial imaging is desired but with significant amounts of LCA. Since axial imaging is desired, the dominant aberration that must be considered is spherical aberration.

In a singlet lens system, it is possible to design it so that it has diffraction limited imaging for single wavelengths and a specific pair of object and image locations. However, this is best accomplished with aspheric surfaces. Since LCA is a result of the dispersive property of the material, the selection of the glass type has a direct consequence on the amount of LCA and hence the dynamic range of the instrument. The material should preferably be high index so that spherical aberration varies little with wavelength. A reasonable choice is Schott SF-11, a relatively high index, high dispersion glass that is commonly available.

Figure 6:
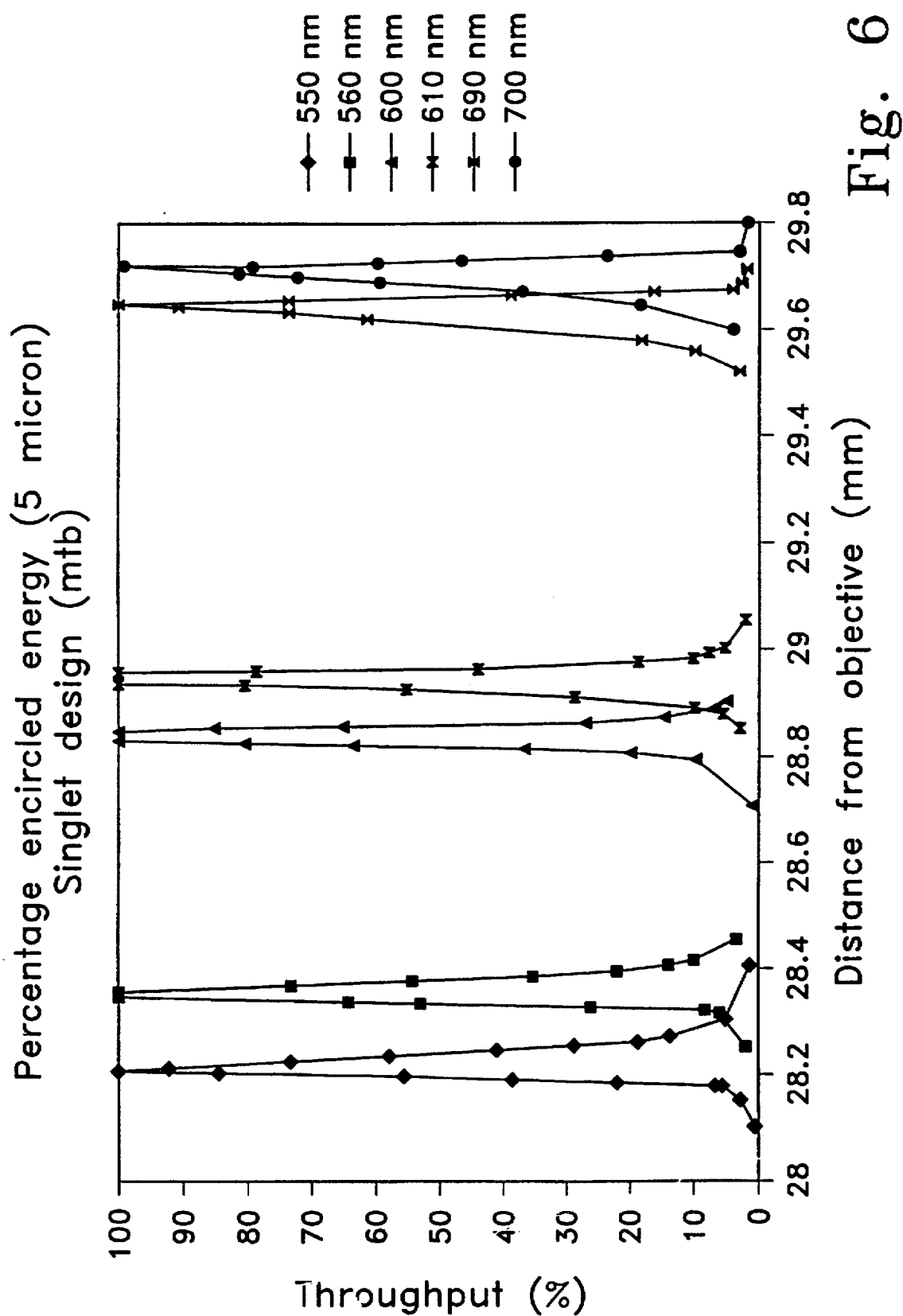
FIG. 6 shows computer simulated wavelength responses and resolution of an embodiment using an aspheric singlet lens design having a known amount of LCA.

Based on such an aspheric singlet lens, a computer simulation of a system using the singlet lens was performed. The system is designed to have approximately 1 mm of LCA, operate within a bandwidth of 400–750 nm, and have most of its energy fall within a circle of 5 microns in diameter. FIG. 6 depicts the simulated wavelength response and resolution of such a system.

Each of the six curves in FIG. 6 represents the intensity throughput of a given wavelength reflected by the target surface and picked up at the spectrometer, versus the distance from the objective lens to the target surface. At the point of maximum intensity throughput at the spectrometer, the distance from the objective lens matches the focal point of the particular wavelength. As the distance from the objective lens deviates from the focal point, the intensity of the recorded wavelength would be expected to drop off.

Because the present invention employs a confocal design, the drop-off of intensity throughput is expected to be very dramatic. Thus, resolution of distances would greatly improve. For example in FIG. 6, the two left-most curves represent wavelengths 550 nm and 560 nm respectively. Their maxima occur at approximately 28.22 mm and 28.38 mm—a distance of 0.16 mm apart.

Looking at FIG. 6, several observations can be made. First, at this distance, the maxima are clearly distinguishable (i.e. the curve of one does not subsume the other to the point where one maxima is not visible). Second, the lower bound resolution of the system is potentially much smaller than 0.16 mm. It appears that the distances between maxima could be much closer and still be distinguishable.

An alternative optical design for the purposes of the present invention is a doublet lens system having a known amount of LCA. In typical optical systems, however, doublet lens are constructed to reduce LCA. This is accomplished by using a low dispersion crown glass and a higher dispersion flint glass. For a typical positive doublet, the crown glass is used to make a positive element and a flint is used to make a negative element. The positive element is stronger (i.e. has a shorter focal length) than a singlet of the same combined power. The intent is to produce exactly the same focal length at two wavelengths and much reduced variation over the rest of the useable range.

Figure 7:
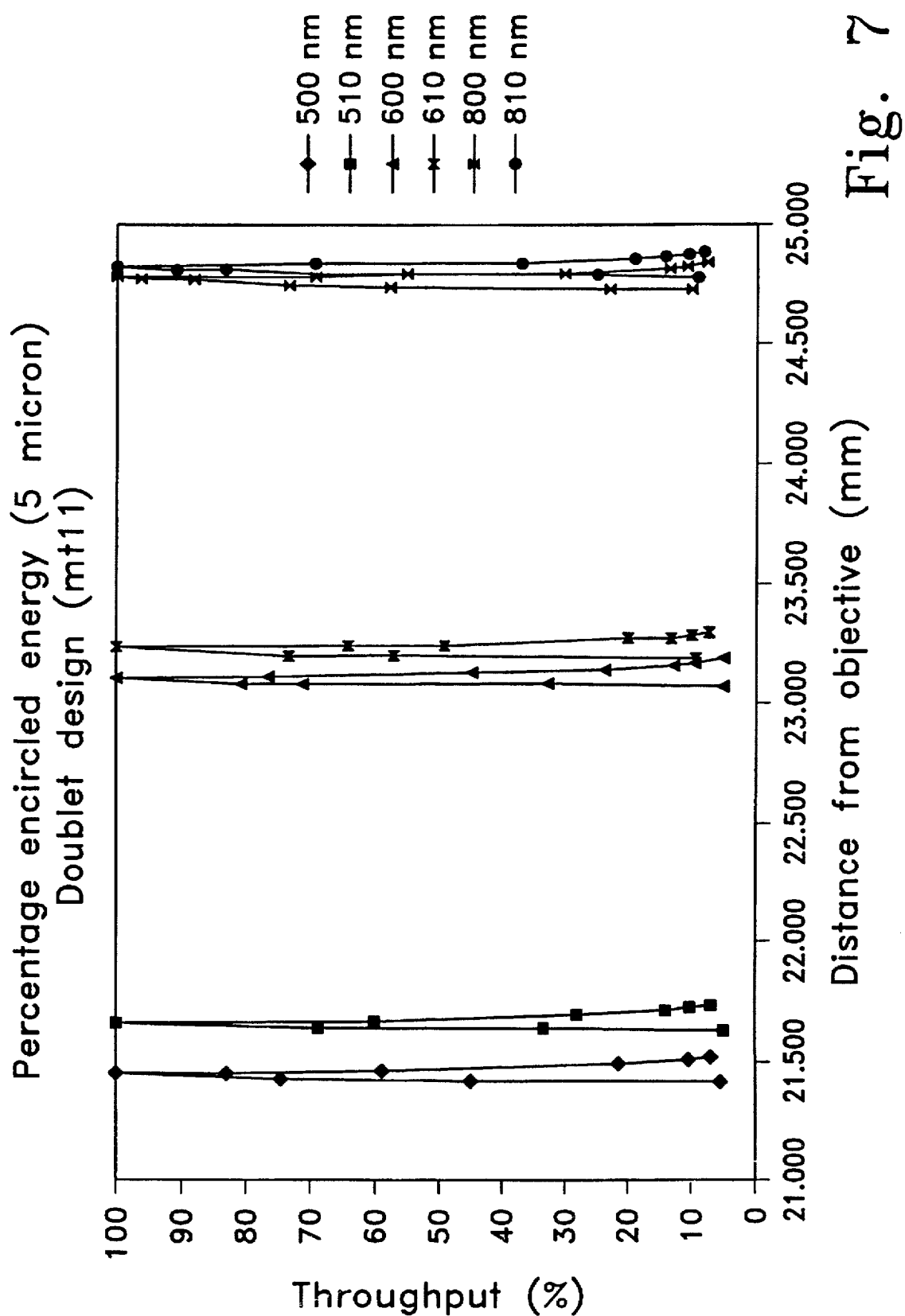
FIG. 7 shows computer simulated wavelength responses and resolution of an embodiment using a symmetrical lens system made of two doublet lens having known amount of LCA.

For the purposes of the present invention, however, even greater LCA is desired than is possible with a singlet. Additionally, it is desired to use spherical surfaces to lower the cost of manufacture. FIG. 7 is a computer simulation of a system employing a series of doublet lenses. As can be seen, the wavelength resolution of the doublet system appears greater than that of the singlet design—with resolution appearing to be about 0.1 mm.

The design of the doublet lenses uses two common glasses (BK7 and SF11) that are placed in a backward fashion to conventional ways of making achromatic doublet lenses. That is, for a positive combination, the negative element is BK7 and the positive element is SF11. The design employs an air space to control spherical aberration rather than producing a cemented design (i.e. where the sides facing each other are essentially the same radius and in contact). The design has a built-in LCA of approximately 3 mm and spherical aberration is well controlled so that most of the energy falls in a circle of 5 microns at the best focus for a given wavelength.

It will be appreciated that this design can be tuned to permit greater or lesser LCA by varying the working distance and F/#. A relatively small F/# can be selected so that depth resolution is good and permit being slightly off-normal and still register accurate measurement.

PROFILING THE CORNEAL SURFACE

In order to quickly profile the cornea, it is necessary to provide a number of scanning points around the surface of the cornea. Since the distance measuring confocal microscope of the present invention longitudinally images a point at a time on the cornea, there is a need to build a scanning mechanism that sweeps one of these microscopic system across the surface of the cornea. Alternatively, arrays of microscopic systems could be built to either speed the scanning across the cornea or to image the cornea in one imaging step.

Figure 8:
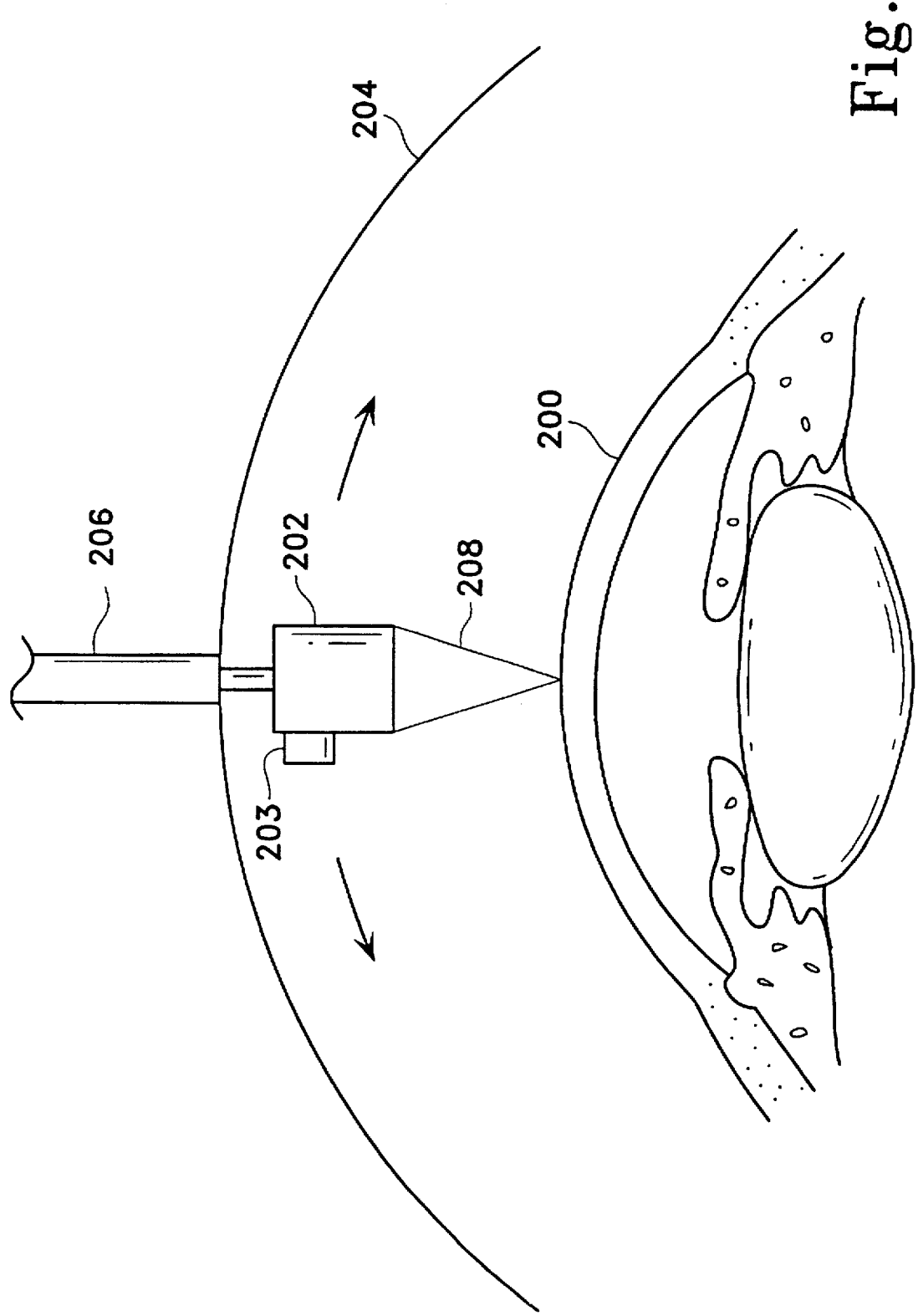
FIG. 8 is a cross-sectional, side view of a scanning mechanism coupled to a distance measuring confocal microscope to produce a quick profile of the eye's cornea.

A side view of one such scanning embodiment is shown in FIG. 8. Cornea 200 is depicted as an approximate half-domed structure. The scanning process is carried out by any one of the embodiments 202 of the presently claimed distance measuring confocal microscope. Scope 202 is movably coupled to scanning track 204 such that, at any given position along track 204, the longitudinally-spread beam 208 of scope 202 is kept as close as possible to the normal of the surface of cornea 200.

As scope 202 is moved about corneal surface, position information is captured by transducer 203. Transducer 203 preferably records three-dimensional spatial orientation of scope 202. One such conventional transducer is a produced by Polhemus Navigation. Such position information is correlated, by methods well known in the art, with the imaging data later to produce a final corneal profile. Position information may be transmitted to a computing means (not shown) for correlation by means of wireless communication, optical encoding and transmission, or via separate electrical connection.

Scanning scope 202 along track 204 provides a radial slice of the corneal surface. In order to obtain total coverage along all radial lines, track 204 is rotatably coupled to a support 206. To obtain a different radial line scan, track 204 may be rotated the requisite number of degrees to the new radial position and scope 202 can be caused to scan along track 204.

Figure 9:
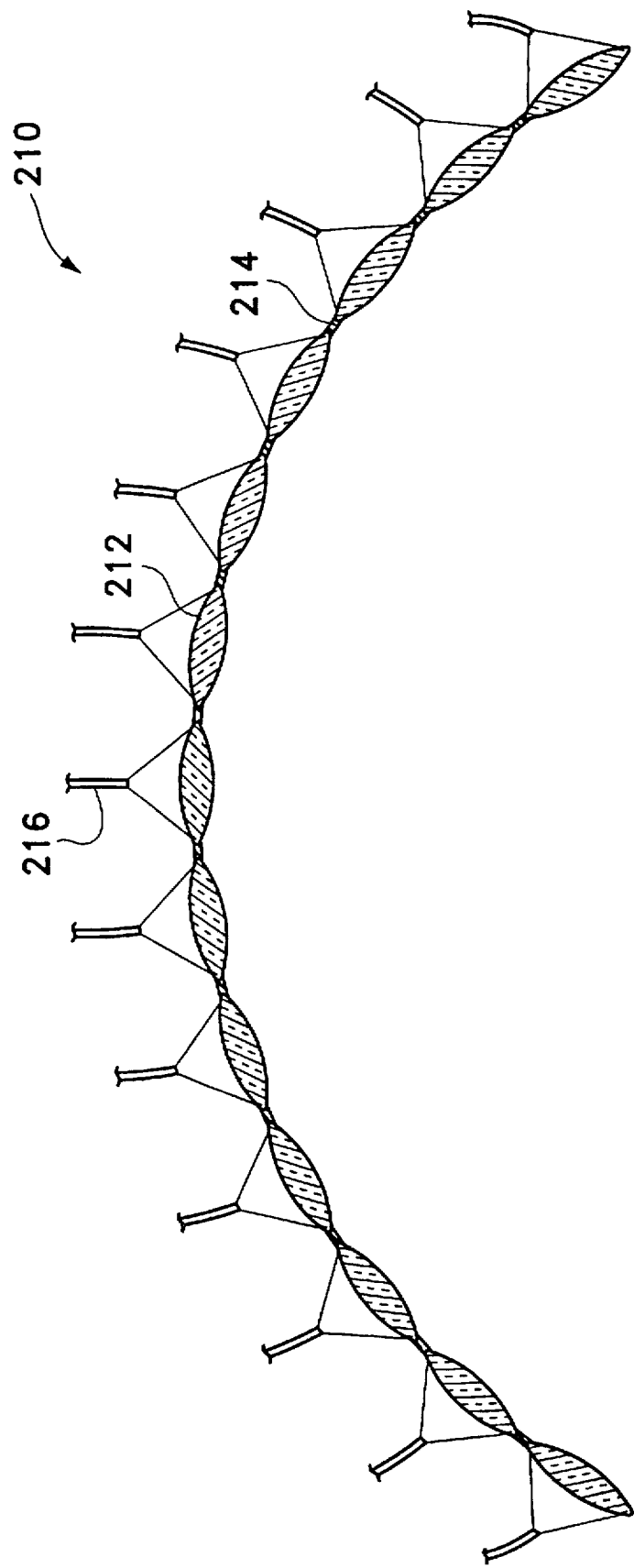
FIG. 9 is a cross-sectional, side view of an array of microlenses that can be used to image the entire surface of the cornea.

Another scanning device 210 is embodied in FIG. 9. FIG. 9 is a cross-sectional, side view of an array of microlenses 212 that are laid out on a concave structure 214 in order to obtain imaging points as close as normal to the convex surface of the cornea. Each microlens 212 is coupled to a fiber optic cable 216 in order to either emit polychromatic light from a set of sources (not shown) or to receive and channel reflected light back to a set of detectors (not shown). Alternatively, each microlens could be coupled to a combined source and detector such that light is both emitted from the microlens and reflected light is captured. For another alternative, each microlens could be coupled to two separate fiber optic cables—each such cable situated slightly off-axis of the microlens, as described earlier.

The microlens could be arrayed in a number of different fashions across the surface of concave structure 214, as shown in FIGS. 10A—10D. For example, the microlens could be arrayed in a tightly packed linear array as in FIG. 10A. In this case, the cornea is imaged a line at a time and the linear array is scanned over the surface of the cornea—as in the radial fashion depicted in FIG. 8 or translated in rectangular X-Y coordinate fashion.

Figure 10A:
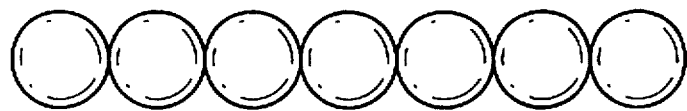
FIGS. 10A–10D depict alternative ways of spacing microlenses in an array structure.
Figure 10B:
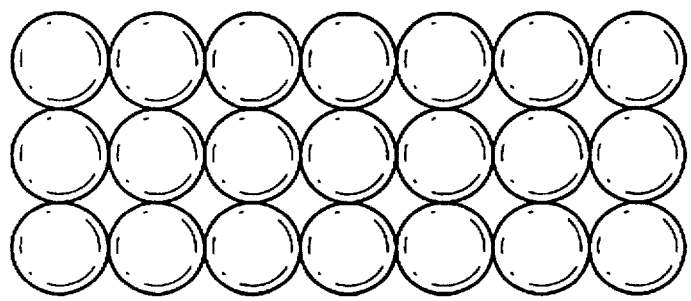
Figure 10C:
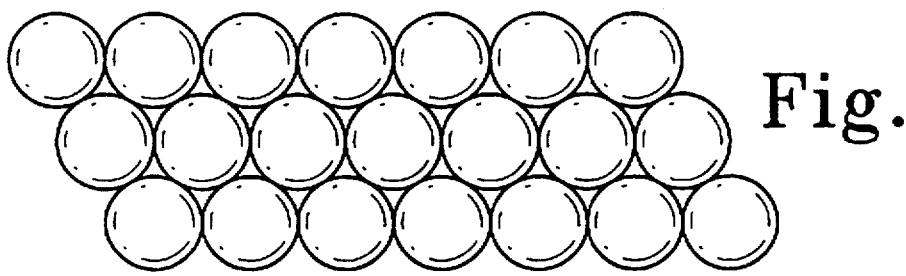
Figure 10D:
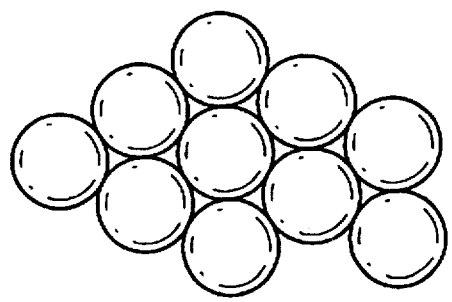

FIGS. 10B through 10D depict two-dimensional ways of packing microlens on the concave structure of FIG. 9. FIG. 10B suggests a regular bin array structure, FIG. 10C a staggered array structure, and FIG. 10D depicts a more irregular arrangement. In all cases, the two-dimensional array may be repeated to cover the entire surface of the concave structure or any portion thereof. If the entire surface is covered, then complete corneal imaging may be done concurrently. Otherwise, there may be a need to scan any array portion over the cornea to obtain complete imaging.

There has thus been shown and described a novel apparatus and method for the quick and accurate determination of surface profile and depth reading within little or no mechanical motion which meets the objects and advantages sought. As stated above, many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. A method for scanning a distance measuring confocal microscope to produce a profile of an object, the steps of said method comprising:
    (A) moving the confocal microscope over a known position such that an imaging beam of polychromatic light is approximately normal to the surface of the object at the known position;
    (B) imaging the known position on the object with the confocal microscope and correlating the image data with the position data;
    (C) repeating steps A and B for a new known position until a suitable profile of the object is complete.

2. The method as recited in claim 1 wherein the step of moving the confocal microscope further includes:
    moving the confocal microscope along a radial path across the object.

3. The method as recited in claim 2 wherein the step of moving the confocal microscope further includes choosing a new radial path for the confocal microscope to follow.

4. The method as recited in claim 1 wherein the step of imaging and correlating the image data with position data further includes:

recognizing and transmitting position data concurrently with image data for correlating.

5. An apparatus for measuring the distance of a set of points on an object from said apparatus, said apparatus comprising:

polychromatic light source;

means for focusing light from said source onto said set of points, said means comprising a known amount of longitudinal chromatic aberration such that different wavelengths emitted from said polychromatic light source have different focal lengths in said object, wherein said means for focusing light comprises a substantially achromatic collimator lens; and a Fresnel zone plate of known chromatic aberration, said collimator lens providing collimated polychromatic light from said source as input into said zone plate;

means for filtering the spectrum of light reflected from said set of points; and means for measuring the spectrum of the light reflected from said object.

6. The apparatus as recited in claim 5 wherein the means for focusing further comprises a first fiber optic cable and the means for filtering further comprises a second fiber optic cable.

7. The apparatus as recited in claim 5 wherein said means for focusing light from said source comprises a singlet lens having a known amount of longitudinal chromatic aberration.

8. The apparatus as recited in claim 5 wherein said means for focusing light from said source comprises the use of doublet lens having a known amount of longitudinal chromatic aberration.

9. A method for determining the depth of a first object embedded in a substantially transparent second object, said substantially transparent second object having a substantially reflective surface, the steps of said method comprising:

(A) focusing light from a polychromatic light source onto said substantially transparent second object such that each wavelength of light has a distinct focal point;

(B) filtering the light reflected from said substantially reflective surface, yielding a first reflected wavelength, and from said first object embedded in said substantially transparent second object, yielding a second reflected wavelength;

(C) measuring the spectrum of the light filtered in step (B);

(D) correlating throughput intensity peaks from said first reflected wavelength and said second reflected wavelength measured in step (C) to determine the depth of said first object embedded in said substantially transparent second object.

10. The method as recited in claim 9 wherein said first object comprises a ring adapted to be placed inside a cornea.

11. The method as recited in claim 9 wherein said first reflected wavelength is reflected from the back surface of the cornea and said second reflective wavelength is reflected from the front surface of the cornea.

12. An apparatus for measuring the distance of a set of points on an object from said apparatus, said apparatus comprising:

polychromatic light source;

means for focusing light from said source onto said set of points, said means comprising a known amount of longitudinal chromatic aberration such that different wavelengths emitted from said polychromatic light source have different focal lengths in said object, wherein said means for focusing light further comprises a first fiber optic cable;

means for filtering the spectrum of light reflected from said set of points wherein said means for filtering further comprises a second fiber optic cable; and means for measuring the spectrum of the light reflected from said object; and a collimator lens wherein said first fiber optic cable and said second fiber optic cable are positioned slightly off-axis from said collimator lens.

\* \* \* \* \*